United States Patent Office 3,407,604
Patented Oct. 29, 1968

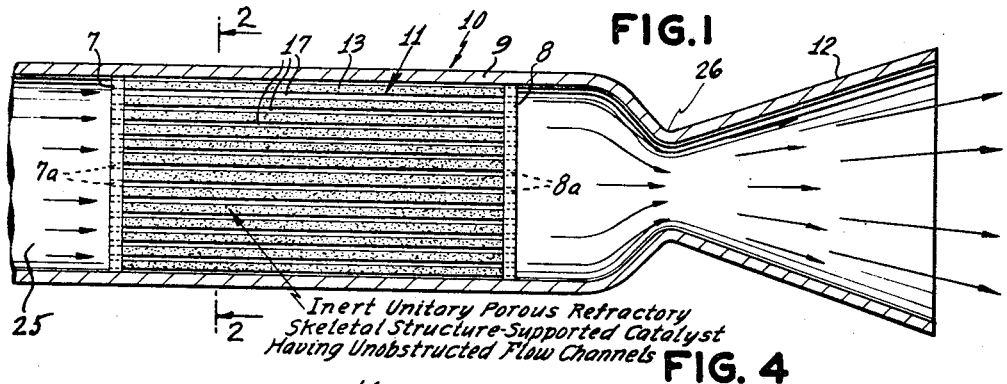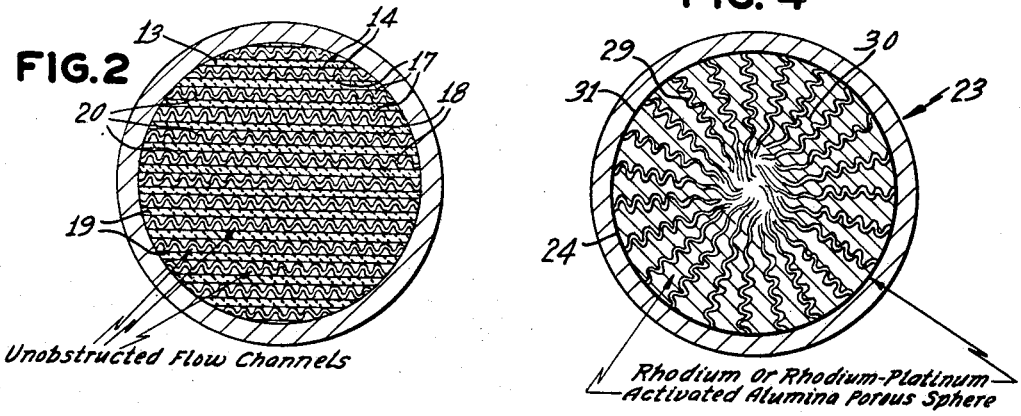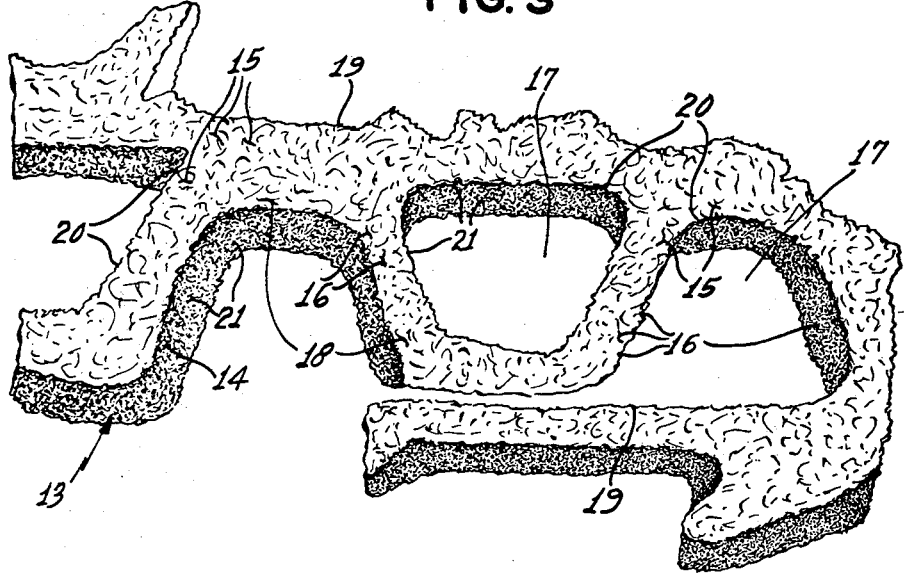

3,407,604
CATALYTIC ROCKET PROPULSION METHOD OF CHEMICALLY COMBINING HYDROGEN AND OXYGEN AT LOW SUBZERO IGNITION TEMPERATURES
Carl D. Keith, Summit, N.J., and Francis J. Mattia, Brooklyn, N.Y., assignors to Engelhard Industries, Inc., Newark, N.J., a corporation of Delaware
Filed June 10, 1965, Ser. No. 462,963
12 Claims. (Cl. 60—217)

ABSTRACT OF THE DISCLOSURE

A method for chemically combining hydrogen and oxygen at temperatures below —50° C. by reaction over a supported rhodium catalyst.

---

This invention relates to the chemical combining of hydrogen and oxygen, and more particularly to a method for chemically combining hydrogen and oxygen at low, subzero ignition temperatures such as, for instance, for the production of thrust for propelling a rocket.

Liquid hydrogen and liquid oxygen have been recognized heretofore as a satisfactory propellant combination for use in the operation of rocket engines. However use of the combination requires an ignition system, and it is necessary that the particular ignition system employed be capable of multiple reignition and have a high degree of reliability. Spark ignition systems for the hydrogen-oxygen combination are not entirely satisfactory for repeated reignition, and further such ignition systems present problems of interference to communication and also to electronic measurements. Moreover the spark ignition systems require additional equipment for generation of electrical power for operation of such ignition systems, with attendant additional weight and expense.

In accordance with the present invention, it has been found that hydrogen and oxygen can be chemically combined in a troublefree, reliable and efficient manner at subzero ignition temperatures between about —50° C. and about —253° C. by contacting a mixture of the hydrogen and oxygen at the ignition temperature within the temperature range aforesaid with a supported rhodium catalyst, i.e., a supported rhodium per se or a supported rhodium-platinum combination, preferably the latter. The invention herein is especially meritorious for operating a rocket engine or motor for producing thrust for propelling the rocket, and for this application the oxygen and hydrogen fuel are admixed and the resulting admixture contacted at the temperature between about —50° C. and about —253° C. with the supported rhodium catalyst in the engine combustion zone to thereby effect ignition and combustion of the fuel. The high energy high temperature combustion gases thus produced are discharged at high velocity through an exhaust nozzle or nozzles of the engine to produce the propelling thrust. The thrust can be utilized for take-off and journey of a rocket, for providing attitude control effects for space vehicles or rockets, or for jet-assisted takeoff of an aircraft from the ground on a short runway.

In a rocket designed for primary propulsion by the reaction of hydrogen and oxygen, for which this invention is particularly useful, only a portion of the hydrogen and oxygen is ignited catalytically and this ignited portion, which is at a high temperature, is then combined with the main portion of the hydrogen-oxygen fuel causing ignition thereof and producing thrust.

The catalyst herein will usually contain an amount of catalytic metal within the range, by weight, of about 0.01–25 percent, preferably about 0.5–5.0 percent (based on total supported catalyst). A catalyst containing a mixture of, by weight, 4 parts of Pt per each part of Rh has been found especially favorable among the preferred catalysts, although greater amounts of rhodium can be employed also with good results. Thus the rhodium-platinum combination catalyst for good results can contain, by weight, from about 20%–99% rhodium and the balance platinum. The carrier is one capable of withstanding thermal shock inasmuch as the temperautre in the combustion chamber of the rocket engine will rise considerably due to the exothermic heat of the combustion with attendant heating of the catalyst. Thus the temperature within the combustion chamber will rise from the ignition temperature within the subzero temperature range previously disclosed herein to as high as about 1100° C. and higher, after which the temperature may be lowered to the subzero temperature range followed by rising again to as high as about 1100° C., and this cooling-reheating cycle of the catalyst may be repeated several times. One catalyst carrier or support well suited for use herein by reason of its capability of withstanding severe and repeated thermal shock and its high activity for the repeated catalyzing of ignitions of $O_2$ and $H_2$ at low subzero temperatures down to about —253° C., is porous spheres of activated alumina. Such porous activated alumina spheres are of high surface area, typically of 395 m.²/g., with a major portion or all or substantially all pores communicating with the surface of the sphere. The spheres may be of pure alumina or may contain minor amounts of refractory oxides such as silica, sodium monoxide, zirconia, magnesia, boria, beryllia. The spherical supported catalysts preferably have a diameter from about 1/32"–5/32".

Another catalyst carrier or support well suited and preferred in the present invention by reason of having outstanding stability to severe and repeated thermal shock and high activity for the repeated catalyzing of ignitions of $H_2$ and $O_2$ at low subzero temperatures down to about —253° C. is a unitary inert porous refractory skeletal structure, block or element having a plurality of fluid flow channels extending through the block with the Rh or the Rh-Pt combination deposited on surfaces of the channels and of superficial macropores, i.e., macropores at, on or close to the surfaces of the channels, and communicating with the channels.

The catalytic ignition of the $H_2$ and $O_2$ herein is effected with the reactants in liquid and/or gaseous phase, usually as a mixture of liquid and gaseous phases. The space velocity of the reactants when contacting the catalyst may be as high as 10,000 WHSV or higher with reactants, i.e., $H_2$ and $O_2$, in liquid phase. By "WHSV" is meant weight of total $H_2+O_2$ feed per hour per weight of oxidation catalyst.

The bed of supported catalyst spheres or the unitary porous refractory skeletal structure-supported catalyst providing the plurality of fluid flow channels, is maintained within the combustion or reaction zone by spaced apart perforated plates or metallic screens of a high temperature-resistant material or metal or by other suitable means. The fluid mixture comprising a mixture of liquid and/or gaseous $H_2$ and of liquid and/or gaseous $O_2$ passes readily through the openings of the perforated plates or screens and over or through the supported catalyst spheres in contact therewith, or through the flow channels of the unitary refractory skeletal structure-supported catalyst when such a supported catalyst or catalysts is utilized and in contact with the Rh or Rh-Pt catalytic metal thereon. The unitary refractory skeletal structure support is also meritorious in producing only low gas back pressures due to its unobstructed flow channels.

The spherical activated alumina-supported catalyst can be prepared by contacting, for instance by immersing or spraying, the porous spheres with an aqueous solution of a water-soluble inorganic salt of rhodium and/or of platinum, heating the thus-contacted spheres to a temperature of typically about 100° C., followed by water-washing the thus-treated spheres, drying the washed spheres, and reducing the metal compound or compounds on the sphere surfaces and surfaces of pores thereof with a steam of hydrogen-containing gas. Alternatively, the spheres may be reduced chemically with formaldehyde, formic acid or sodium formate prior to or after washing. Suitable salts of rhodium and platinum for the preparation are $RhCl_3$ and $K_2PtCl_4$. The unitary refractory structure-supported catalyst of this invention providing the gas flow channels therethrough can be prepared by immersing the unitary porous structure preferably with a previously applied deposit or film of a high surface area activated refractory metal oxide as hereinafter disclosed, for instance activated alumina, on the surfaces of its flow channels and macropores communicating therewith, in an aqueous solution of the water-soluble inorganic salt of rhodium and/or of platinum, with the remainder of the preparation procedure similar to the corresponding procedure supra for preparing the sphere supported catalyst.

The unitary refractory skeletal structure carrier or support onto which the catalytic metal or metals are deposited is an inert porous refractory skeletal structure having a plurality of unobstructed fluid flow channels extending therethrough in the direction of fluid flow. The supported catalyst is disposed in the reactor or engine combustion zone in such fashion that its unitary skeletal structure occupies approximately all of the cross-sectional area of such zone, with packing between it and the reactor or engine walls to prevent by-passing of the skeletal block by any part of the fluid stream. A plurality of parallel-situate closely fitting skeletal block-supported catalysts may be disposed within the reactor or engine combustion zone, if desired. The unitary skeletal structure support is advantageously shaped to fit the combustion zone into which it is to be deposed, and the body or block support of the catalyst is placed therein lengthwise as to its cellular flow chanels so that the hydrogen and oxygen fluid reactants, i.e., liquids and/or gases and/or vapors, flow through the channels during their passage through the combustion zone.

The unitary refractory skeletal structure support is constructed of a substantially chemically and catalytically inert, rigid, solid refractory material capable of maintaining its shape and strength at very low temperatures as low as about −253° C. and at very high temperatures, for instance up to about 1100° C. The refractory materials has a bulk density of about 0.45–1.75 grams per cubic centimeter, preferably about 0.6–1.4 grams per cubic centimeter, and is unglazed and essentially entirely crystalline in form and marked by the absence of any significant amount of glassy or amorphous matrices, for instance of the type found in porcelain materials. Further, the skeletal structure has considerable accessible porosity as distinguished from the substantially nonporous porcelain utilized for electrical applications, for instance spark plug manufacture, characterized by having relatively little accessible porosity. The accessible pore volume not including the volume of the fluid flow channels is preferably in excess of .10 cubic centimeter per gram of skeletal structure, more preferably between .20 and .30 cc./g.

The walls of the channels of the unitary skeletal support structures of this invention are thin walls containing superficial macropores in communication with the channels to provide a considerably increased accessible catalyst surface, and an absence of small pores for high temperature stability and strength. Whereas the superficial surface area of such structures may be of the order of 0.001 to 0.01 m.$^2$/g. including the channels, the total surface area is typically hundreds of times greater, so that much of the catalytic reaction takes place in the superficial macropoes. The skeletal structure has a macropore distribution such that over 95% of the pore volume is in pores having a size, i.e., diameter, greater than 2000 Angstrom units, and over 5% of the pore volume is in pores having a size of over 20,000 A.

The geometric superficial or apparent surface area of the carrier including the walls of the flow channels should be as large as is consistent with an acceptable back pressure in the flow system. The superficial surface area will often be about 0.5 to 6, preferably 1 to 2.5, square meters per liter of support. Thus the channels through the unitary body or skeletal structure can be of any shape and size consistent with the desired superficial surface, and should be large enough to permit free passage of the fluid mixture of $H_2$ and $O_2$. The channels are generally parallel and are separated from one another by thin walls defining the channels. However, the channels may be interconnected or criss-crossed and the path of gas flow may be circuitous through the catalyst structure. For most efficient operation, the channel inlet openings are distributed across substantially the entire face or cross-section of the catalyst support subject to initial contact with the $H_2$ and $O_2$ to be reacted. The preferred skeletal structure supports of this invention are of zircon-mullite and alpha alumina. Examples of other refractory crystalline ceramic materials utilizable in place of the preferred materials as support or carrier are zirconium silicate, sillimanite, magnesium silicates, zircon, petalite, spodumene, cordierite and alumina-silicates.

The activated refractory metal oxide is deposited on the unitary porous refractory skeletal support in a continuous thin deposit or as discontinuous thin deposits preferably of thickness of about 0.0004″ to 0.001″. Such activated oxide is a calcined refractory metal oxide characterized by a porous structure and a large internal pore volume and total surface area. Generally, the total surface area of the activated refractory metal oxide is at least about 25 square meters/gram, preferably at least about 100 square meters/gram. Such oxides can be prepared by dehydrating preferably substantially completely the hydrate form of the oxide by calcination usually at temperatures of about 150° C. to 800° C. The preferred active metal oxides contain members of the gamma or activated alumina family which can be prepared, for instance, by precipitating a hydrous alumina gel and thereafter drying and calcining to expel hydrated water and provide the active gamma-alumina. A particularly preferred active refractory metal oxide is obtained by drying and calcining at temperatures of about 300° C. to 800° C. a mixture of precursor hydrous alumina phases predominating in crystalline trihydrate, that is, containing in excess of about 50% of the total alumina hydrate composition, preferably about 65%–95%, of one or more of the trihydrate forms gibbsite, bayerite and nordstrandite by X-ray diffraction. The substantial balance of the hydrate, preferably about 35% to 5%, may be amorphous hydrous or monohydrate boehmite alumina. Calcination of the precursor hydrous alumina is preferably controlled so that the gamma-alumina obtained contains monohydrate alumina in an amount substantially equivalent to that originally present in the mixture of the high trihydrate precursor hydrous alumina phases. Other suitable active metal oxides include for example active or calcined beryllia, zirconia, magnesia, silica, etc., and combinations of metal oxides such as boria-alumina, silica-alumina, etc. Preferably the activated refractory oxide is composed predominantly of oxides of one or more metals of Groups II, III and IV having atomic numbers not exceeding 40. The active refractory metal oxide deposit may constitute about 15 to 150 grams per liter of the unitary support, preferably about 30 to 75 grams per liter.

Providing the support with a deposit of the active refractory metal oxide of the present invention can be done in several ways. One method involves dipping the support into a solution of the salt of the refractory metal and calcining to decompose the salt to the oxide form. A more preferred method comprises dipping the support into an aqueous suspension, dispersion or slurry of the refractory oxide itself, drying and calcining. In this method, suspensions or dispersions having a solids content in the range of about 10% to 70% by weight can be used to deposit a suitable amount of an active refractory metal oxide on the support in a single application. In order to prepare a catalyst having 10% activated alumina on a zircon-mullite structure, about 20%–40% solids in the suspension is used. The percent solids is determined on an ignited weight basis (ignited at 1100° C.). In general, calcining temperatures within the range of about 150° C. to 800° C. are employed. The calcination is favorably conducted in air, for example flowing dried air, or may be carried out in contact with other gases such as oxygen, nitrogen, hydrogen, flue gas, etc. or under vacuum conditions. The refractory oxide is deposited on the surfaces of the skeletal structure including the channel surfaces and the surfaces of the superficial macropores in communication with the channel surfaces as thin deposits in an amount, by weight, of about 1% to 50% and preferably 5% to 30% based on the weight of the skeletal structure.

The fluid flow channels can be one or more of a variety of cross-sectional shapes and sizes, each channel space being defined by ceramic walls. Such channels are usually separated from one another by a wall of refractory or ceramic material. The channels can be of the cross-sectional shape, for example, of trapezoids, triangles, rectangles, squares, sinusoids or circles so that cross-sections of the support represent a repeating pattern that can be described as a honeycomb, corrugated or lattice structure. The walls of the cellular channels are generally of the minimum thickness necessary to provide a strong unitary body, with this wall thickness usually being in the range of about 2 to 25 mils. With such wall thickness the structures contain from about 75–2500 or more fluid inlet openings for the flow channels per square inch and a corresponding number of the fluid flow channels. The size, shape and dimensions of the inert unitary refractory skeletal block support or carrier of this invention can be varied widely as desired, with the size and shape of such support being generally conformed to the desired configuration of the reaction zone.

The unitary refractory skeletal structure, element or block catalyst supports providing the multiplicity of unobstructed fluid flow channels can be prepared from any of the refractory ceramic materials previously mentioned herein. One method of preparing such catalyst supports is by applying by spraying, dipping or brushing a suspension of the pulverized ceramic material and an organic binder, for instance gum arabic, colophony, acrylate resins, methacrylate resins, alkyl resins, phenolic resins or a chlorinated paraffin, to each side of a plurality of flexible organic carrier sheets, for instance of cellulose acetate paper, onion skin paper, nylon cloth or polyethylene film. Several of the thus-coated carrier sheets are then corrugated by, for instance, crimping or multifolding of the sheets, and the remaining coated carrier sheets are left in their original flat condition. The coated corrugated and flat sheets are then superposed one on another in alternate corrugated and flat sheet relationship. The resultant multilayer structure is then fired in a furnace at a slow rate to prevent breakage due to the thermal shock and to a temperature sufficiently high to sinter the ceramic particles into a unitary structure. During the firing the organic binders are removed by decomposition and volatilization. Such preparation method is disclosed in British Patent 882,484. The unitary refractory skeletal structure, element or block supports are also obtainable in commerce from the Minnesota Mining and Manufacturing Company.

Where more than one of the unitary refractory skeletal structure-supported catalysts are used, such unitary refractory skeletal structure-supported catalysts are in a fixed and predetermined relationship to each other and to the fluid flow; for instance the structures can be placed in parallel with respect to fluid flow.

Reference is now made to the accompanying drawings wherein:

FIGURE 1 is a schematic longitudinal sectional view partially broken away through a rocket motor equipped with an inert unitary solid porous refractory structure-supported rhodium catalyst, having a large plurality of unobstructed fluid flow channels extending through the refractory support structure;

FIGURE 2 is a transverse sectional view taken on line 2—2 of FIGURE 1;

FIGURE 3 is a broken away enlarged transverse sectional view of a preferred supported catalyst of the method herein; and FIGURE 4 is a schematic enlarged transverse sectional view of another preferred supported catalyst utilizable in the method herein.

Referring to FIGURE 1, rocket motor 10 has catalytic combustion chamber 11 and nozzle 12. Unitary inert porous refractory skeletal structure- or block-supported oxidation catalyst 13, shown in detail in FIGURE 2 and a preferred catalyst herein, has a large plurality of flow channels 17 extending through its refractory structure and is secured within combustion chamber 11 by perforated end plates 7 and 8, plates 7 and 8 being securely affixed to wall 9 of motor 10. Plates 7 and 8 have a large plurality of openings or passages 7a and 8a respectively therethrough corresponding in size and number to that of the flow channels 17 of catalyst, and supported catalyst 13 is so disposed in combustion chamber 11 that its flow channels 17 register with the openings in plates 7 and 8.

As shown in FIGURE 2, supported catalyst 13 comprises unitary porous refractory skeletal structure or block 14 of zircon-mullite, which is inert and porous, as support. Fluid flow channels 17, as shown, are of generally trapezoidal shape in cross section and are defined by corrugations 18 and generally horizontal layers 19 of the skeletal structure. Catalytic metal 20 of a rhodium-platinum alloy containing an amount of rhodium within the weight percentage range previously specified herein and the balance platinum, is deposited directly on the surfaces of flow channels 17 and of superficial macropores 16, shown in FIGURE 3, communicating with the channels.

With reference to FIGURE 3, supported catalyst 13 is similar to that of FIGURE 2 except that in the FIGURE 3 embodiment, an activated refractory metal oxide, for instance eta and/or gamma-aluminia, is deposited as discontinuous deposits 21 on the surface of fluid flow channels 17 and also on the surfaces of superficial macropores 16 which communicate with the channels, and the rhodium-platinum alloy catalyst is in turn deposited on the activated refractory metal oxide although some of the alloy catalytic metal may also be deposited directly on the refractory skeletal structure surfaces in this FIGURE 3 embodiment. Superficial macropores 16 of the support skeletal structure or block are predominantly of size, i.e., diameter, in excess of 2000 Angstrom units. Support skeletal block 14 of the FIGURE 3 catalyst and also of the FIGURE 2 catalyst, also has pores 15 in its interior portion.

Referring to FIGURE 4, porous spherical supported catalyst 23 of an activated alumina can also be utilized as the catalyst in the catalytic combustion chamber 11 of the rocket engine, shown in FIGURE 1, in place of the unitary inert refractory skeletal structure-supported catalyst 13 providing the large plurality of flow channels therethrough. The porous spherical support 30 of catalyst 23, which is characterized by having a major portion or all or substantially all of pores 29 of the activated alumina sphere communicating with the surface 31 of the spheres, is obtained by calcining at 450°–650° C. a precursor alumina containing a major portion of $\beta$-trihydrate and shaping the resulting activated alumina into sphere form.

Thin film 24 of rhodium or a rhodium-platinum alloy, preferably having a weight ratio of platinum to rhodium of 4:1 respectively, is deposited on the surface of the alumina spherical support and also on surfaces of pores 29. The total Rh-Pt content of the supported catalyst sphere is about 0.5% by weight. When catalyst spheres 23 are utilized, the passages through end plates 7 and 8 of the rocket motor should be sufficiently small that spheres 23 can not pass therethrough. Alternatively metal screens can be utilized in place of plates 7 and 8 when catalyst spheres 23 are utilized to retain spheres 23 within combustion chamber or zone 11.

Referring again to FIGURE 1, a fluid mixture of liquid and/or gaseous $H_2$ and of liquid and/or gaseous $O_2$ at a temperature of typically about $-253°$ C. is provided under pressure in forward compartment 25 of rocket motor 10 by supply conduit means (not shown) and in conventional manner. The fluid mixture of $H_2$ and $O_2$, which is a stoichiometric mixture, flows through openings 7a of end plate 7, and into and through flow channels 17 extending straight through unitary refractory structure-supported catalyst 13. While flowing in channels 17, the $H_2$-$O_2$ mixture contacts the rhodium or rhodium-platinum alloy catalyst on the surfaces of flow channels 17 and also on the surfaces of the superficial macropores 16 communicating with the channels, thereby to effect ignition and combustion of the hydrogen. The exothermic reaction results in a considerable temperature increase, with the result hot effluent gases pass at high velocity out of flow channels 17 and through passages 8a in end plate 8. The hot gases pass outwardly through throat 26 and nozzle 12 at high velocity thereby producing the thrust.

The following examples further illustrate the invention. In the test runs of the examples Pd on $Al_2O_3$ spheres and a Pt-Rh combination on $Al_2O_3$ spheres were separately tested as catalyst for the combustion-reaction of $H_2$ and $O_2$ at above zero and subzero temperatures. Hydrogen gas, with varying amounts of oxygen or air, was fed to a reactor which comprised a stainless steel tube of about ½" I.D. x 4½" long containing approximately 5 to 6 grams of the catalyst. Thermocouples at the inlet and outlet of the reactor bed were used to determine temperature of the feed to the catalyst bed and the effluent from the catalyst bed, respectively. A temperature rise in the bed was indicative of ignition. Ignition at various low temperatures was determined as follows: Initially the gas mixture was fed at room temperature. If ignition occurred, the temperature in the reactor was lowered, first by means of a cooling bath containing acetone and Dry Ice to $-72°$ C., and then to $-95°$ C. and $-190°$ C. by adding varying amounts of liquid nitrogen to acetone.

The hydrogen-oxygen feed to the reactor was precooled before charged to the reactor. On ignition, the catalyst was soon heated to about 1100° C. The catalyst was then abruptly recooled to the subzero temperatures above mentioned. These wide fluctuations in temperatures subjected the catalysts to severe thermal shock.

The results are set forth in TABLE 1 which follows:

Rh (based on total catalytic metal), effected ignition at low subzero temperatures of $-72°$C., $-95°$C. and $-190°$ C. respectively as well as at $+25°$ C. On the contrary the Pd on $Al_2O_3$ resulted in no ignition at $-72°$ C., and in view of this undoubtedly would not have resulted in ignition of the $H_2$-$O_2$ mixture at temperatures lower than $-72°$ C. The $Al_2O_3$ of all of Examples 1-6 was in the form of ⅛" diameter spheres. The surface area of the alumina was about 350 m.²/g. The percentage of catalytic metal on the alumina is based on weight of total supported catalyst.

*Example 7*

A test to determine catalytic ignition temperature of a feed containing 25% $O_2$ and 75% $H_2$ was performed on a catalyst containing 0.4% Pt.–0.12% Rh on alumina spheres. The alumina comprised ⅛" diameter spheres containing <0.5% impurities. The alumina was further characterized by a surface area of 300–400 m.²/g. and had high crush strength. At a space velocity of approximately 40,000 cubic feet of gas per cubic foot of catalyst per hour, ignition was observed at $-195°$ C.

*Example 8*

Catalysts used as low subzero temperature igniters in the operation of rocket engines must be capable of withstanding extreme and rapid variations in temperature without breakage. The following test was performed on various activated alumina spheres and on a zircon-mullite ceramic structure to determine thermal stability.

Samples of various activated alumina supports and samples of zircon-mullite structural ceramic block having a multiplicity of unobstructed channels or passages extending therethrough were tested for thermal stability. The sample was placed in a cage and suspended into a Dewar flask containing liquid nitrogen. After the material had reached thermal equilibrium, the cage was quickly removed from the flask and the contents emptied into a quartz boat, which had just been removed from a furnace operating at 1100° C. The hot boat with the support material therein was placed in the 1100° C. furnace for several minutes. Thereafter, the boat was removed from the hot furnace and its contents immediately emptied into a wire cage which was then plunged into liquid nitrogen. The support material was permitted to reach equilibrium in the nitrogen. After removing the sample from the nitrogen, it was examined for breakage and cracks.

The following materials were tested and found free of cracks and free of any evidence of breakage.

(a) Activated alumina spheres:

Composition=91%–100% inclusive $Al_2O_3$, 0.0–9% $SiO_2$, 0.0–0.4% $Na_2O$,
Porosity=0.61 cc./g.,
Surface area=395 m.²/g.

(b) Inert, unitary, porous ceramic support structure having multiplicity of unobstructed channels extending therethrough:

Composition=zircon-mullite,

TABLE 1

| Example | Catalyst | Quantity, Grams | Flow in S.c.f.h. | | Temperature Utilized, ° C. | Result |
|---|---|---|---|---|---|---|
| | | | $H_2$ | $O_2$ | | |
| 1 | 0.5% Pd on $Al_2O_3$ | 5.84 | 56.0 | 0.65 | +25 | Ignition |
| 2 | 0.5% Pd on $Al_2O_3$ | 5.84 | 7.4–56.0 | 0.6–4.8 | −72 | No ignition. |
| 3 | 0.4% Pt–0.1% Rh on $Al_2O_3$ | 5.67 | 52.0 | 0.6 | +25 | Ignition. |
| 4 | 0.4% Pt–0.1% Rh on $Al_2O_3$ | 5.67 | 48.5 | 0.6 | −72 | Do. |
| 5 | 0.4% Pt–0.1% Rh on $Al_2O_3$ | 5.67 | 48.5 | ¹0.2 | −95 | Do |
| 6 | 0.4% Pt–0.1% Rh on $Al_2O_3$ | 5.67 | 37.5 | ¹0.2 | −190 | Do. |

¹ 1.3 S.c.f.h. of air.

"S.c.f.h." in the column heading of TABLE 1 means flow of the gas mixture comprising $H_2$ and $O_2$ in cubic feet per hour at standard conditions. The data of TABLE 1 show that the Pt-Rh on $Al_2O_3$ of the runs of Examples 4, 5 and 6, which contained, by weight, 80% Pt and 20%

Accessible pore volume=0.2–0.3 cc./g.,
Superficial surface area =.001–0.1 m.²/g.,
Channels=150 channels/sq. in. The percent open space (provided by the channels) being in excess of 60% of the total area, Macropore distribution=predominantly in pores <2000 A. diameter.

What is claimed is:

1. A method for chemically combining hydrogen and oxygen to form water which comprises contacting a fluid mixture of hydrogen and oxygen at an ignition temperature between about −50° C. and about −253° C. with a supported rhodium catalyst.

2. The method of claim 1 wherein the catalyst is supported on porous spheres of activated alumina.

3. The method of claim 1 wherein the mixture of hydrogen and oxygen is contacted with the catalyst by passing the fluid mixture through a plurality of unobstructed fluid flow channels extending through an inert unitary solid porous refractory skeletal block and in contact with a rhodium catalyst on the surfaces of the channels and of superficial macropores communicating with the channels.

4. A method for producing thrust for propelling a rocket, which comprises contacting an admixture of oxygen and hydrogen as fuel at an ignition temperature between about −253° C. and about −50° C. with a supported rhodium catalyst in a combustion zone of the rocket engine to thereby effect ignition and combustion of the fuel, and discharging the combustion gases thus produced at high temperature and high velocity through an exhaust nozzle of the engine to produce a propelling thrust.

5. The method of claim 4 wherein the rhodium catalyst is supported on porous spheres of activated alumina.

6. The method of claim 5 wherein the rhodium catalyst is a rhodium-platinum combination.

7. The method of claim 5 wherein the rhodium catalyst is rhodium per se.

8. The method of claim 4 wherein the fluid mixture of hydrogen and oxygen is contacted with the catalyst by passing the fluid mixture through a plurality of unobstructed fluid flow channels extending through an inert unitary solid porous refractory skeletal structure and in contact with a rhodium catalyst on the surfaces of the channels and of superficial macropores communicating with the channels.

9. The method of claim 8 wherein the rhodium catalyst is a rhodium-platinum combination.

10. The method of claim 8 wherein the rhodium catalyst is rhodium per se.

11. The method of claim 8 wherein the surfaces of the flow channels and of the macropores of the unitary refractory structure have thereon a deposit of an activated refractory metal oxide, with the rhodium catalyst on the activated refractory metal oxide.

12. A method for producing thrust for propelling a rocket, which comprises contacting an admixture of oxygen and hydrogen as fuel at an ignition temperature between about −253° C. and about −50° C. with a supported rhodium catalyst in a combustion zone of the rocket engine to thereby effect ignition and combustion of the fuel.

References Cited

UNITED STATES PATENTS

| | | | |
|---|---|---|---|
| 3,196,179 | 7/1965 | Robinson | 252—472 X |
| 3,312,526 | 4/1967 | Hanson et al. | 23—204 |
| 3,352,938 | 11/1967 | Plonsker et al. | 252—472 X |

BENJAMIN R. PADGETT, *Primary Examiner.*